United States Patent
Kang

(10) Patent No.: US 10,422,652 B2
(45) Date of Patent: Sep. 24, 2019

(54) VEHICLE, AND CONTROL METHOD THEREOF

(71) Applicant: Hyundai Motor Company, Seoul (KR)

(72) Inventor: Kyunghyun Kang, Suwon-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 14/949,103

(22) Filed: Nov. 23, 2015

(65) Prior Publication Data

US 2016/0272117 A1     Sep. 22, 2016

(30) Foreign Application Priority Data

Mar. 19, 2015 (KR) ................... 10-2015-0038432

(51) Int. Cl.
| | |
|---|---|
| *G01C 21/36* | (2006.01) |
| *H04W 76/14* | (2018.01) |
| *B60R 1/00* | (2006.01) |
| *G08G 1/16* | (2006.01) |

(52) U.S. Cl.
CPC ........... *G01C 21/3602* (2013.01); *B60R 1/00* (2013.01); *G01C 21/3658* (2013.01); *G08G 1/163* (2013.01); *G08G 1/167* (2013.01); *H04W 76/14* (2018.02); *B60R 2300/205* (2013.01); *B60R 2300/50* (2013.01); *B60R 2300/804* (2013.01); *G08G 1/166* (2013.01)

(58) Field of Classification Search
CPC .... G01C 21/3602; G08G 1/163; G08G 1/166; G08G 1/167; B60R 1/00; B60R 11/04; B60R 2300/105; B60R 2300/205; B60R 2300/802; B60R 2300/804; H04W 76/023
See application file for complete search history.

(56) References Cited

U.S. PATENT DOCUMENTS

| | | | | |
|---|---|---|---|---|
| 5,790,403 | A * | 8/1998 | Nakayama | G05D 1/0246 340/435 |
| 9,098,753 | B1 * | 8/2015 | Zhu | G06K 9/00805 |
| 2002/0191837 | A1 * | 12/2002 | Takeda | G01C 11/06 382/154 |
| 2006/0224301 | A1 * | 10/2006 | Sakagami | G01C 21/26 701/500 |
| 2009/0274374 | A1 * | 11/2009 | Hirohata | G03G 15/5025 382/218 |
| 2010/0020169 | A1 * | 1/2010 | Jang | G01C 21/36 348/115 |

(Continued)

FOREIGN PATENT DOCUMENTS

| | | | |
|---|---|---|---|
| JP | 2005174061 A | * | 6/2005 |
| JP | 2007-071579 A | | 3/2007 |

(Continued)

*Primary Examiner* — Abby Y Lin
*Assistant Examiner* — Kelly D Williams
(74) *Attorney, Agent, or Firm* — Brinks Gilson & Lione

(57) ABSTRACT

A vehicle includes: a communication unit to receive image information from a plurality of other vehicles existing around a vehicle; a determining unit which matches the received image information to create around view information and determines a lane on which the vehicle travels, based on the around view information; and a controller to control a device in the vehicle based on the result of the determination on the lane on which the vehicle travels to provide a route guidance.

16 Claims, 13 Drawing Sheets

(56) References Cited

U.S. PATENT DOCUMENTS

2015/0210312 A1\* 7/2015 Stein .................... B60W 30/00
701/41

FOREIGN PATENT DOCUMENTS

| JP | 2007-156755 | 6/2007 |
| JP | 2011-134087 | 7/2011 |
| JP | 2012-238147 | 12/2012 |
| KR | 10-2009-0109312 A | 10/2009 |
| KR | 10-2014-0030697 A | 3/2014 |
| KR | 10-2014-0136150 | 11/2014 |
| KR | 10-2015-0017095 A | 2/2015 |

\* cited by examiner

VEHICLE, AND CONTROL METHOD THEREOF

CROSS-REFERENCE TO RELATED APPLICATION

This application claims the benefit of Korean Patent Application No. 10-2015-0038432, filed on Mar. 19, 2015, which is incorporated herein by reference in its entirety.

FIELD

The present disclosure relate to a vehicle of guiding a driving route, and a method of controlling the vehicle.

BACKGROUND

The statements in this section merely provide background information related to the present disclosure and may not constitute prior art.

Lately, many vehicles adopt dynamic route guidance system. The dynamic route guidance system, which is one of methods of guiding a driving route, is sub system to provide dynamic traffic information to a vehicle, to reset a driving route of the vehicle when unexpected weather, a road closure, an accident, or the like occurs, based on the dynamic traffic information, and to provide a driving guidance service based on current location information of the vehicle received through a Global Positioning System (GPS) satellite. Also, other various systems to guide a driving route of a moving vehicle are introduced.

SUMMARY

The present disclosure provides a vehicle including: a communication unit configured to receive image information from a plurality of other vehicles existing around a vehicle; a determining unit configured to match the received image information to create around view information, and to determine a lane on which the vehicle travels, based on the around view information; and a controller configured to control a device in the vehicle based on the result of the determination on the lane on which the vehicle travels to provide route guidance.

The communication unit may receive the image information from the plurality of other vehicles existing around the vehicle, through Device-to-Device (D2D) communication or via a base station.

The determining unit may match the received image information using at least one singularity included in the received image information to create the around view information.

The determining unit may create the around view information using coordinate information and size information of at least one singularity included in the received image information.

The vehicle may further include a localization unit configured to acquire location information of the vehicle.

The determining unit may match the received image information to create the around view information, and determine a lane on which the vehicle is located among all lanes of a road on which the vehicle travels, using the around view information and the location information of the vehicle.

If the determining unit determines that a predetermined valid time has elapsed after at least one image information of the received image information has been photographed, when matching the received image information, the determining unit may exclude the at least one image information, and match the remaining image information to create the around view information.

The determining unit may match the received image information to create the around view information, and control the device in the vehicle based on road information and vehicle information extracted from the around view information to provide route guidance.

The determining unit may determine traffic flow for each lane of the road on which the vehicle travels, based on the road information and the vehicle information, and set a driving route to which the traffic flow for each lane is reflected, based on the traffic flow for each lane and the result of the determination on the lane on which the vehicle is located.

The controller may control at least one of a display, a Head-Up Display (HUD), a windshield display, and a speaker in the vehicle, based on the result of the determination, to provide route guidance.

In accordance with one aspect of the present disclosure, a method of controlling a vehicle includes: receiving image information from a plurality of other vehicles existing around a vehicle; determining a lane on which the vehicle travels, based on around view information created by matching the received image information; and controlling a device in the vehicle based on the result of the determination to provide route guidance.

The receiving of the image information may include receiving the image information from the plurality of other vehicles existing around the vehicle, through Device-to-Device (D2D) communication or via a base station.

The determining of the lane on which the vehicle travels may include matching the received image information using at least one singularity included in the received image information to create the around view information.

The determining of the lane on which the vehicle travels may include creating the around view information using coordinate information and size information of at least one singularity included in the received image information.

The determining of the lane on which the vehicle travels may further include acquiring acquire location information of the vehicle, through a localization unit.

The determining of the lane on which the vehicle travels may further include matching the received image information to create the around view information, and determining a lane on which the vehicle is located among all lanes of a road on which the vehicle travels, using the around view information and the location information of the vehicle.

The determining of the lane on which the vehicle travels may include matching the received image information to create the around view information, and extracting road information and vehicle information from the around view information.

The controlling of the device in the vehicle may include controlling the device in the vehicle based on the extracted road information and the extracted vehicle information to provide route guidance.

The controlling of the device in the vehicle may include controlling at least one of a display, a Head-Up Display (HUD), a windshield display, and a speaker in the vehicle, based on the result of the determination, to provide route guidance.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 5A:
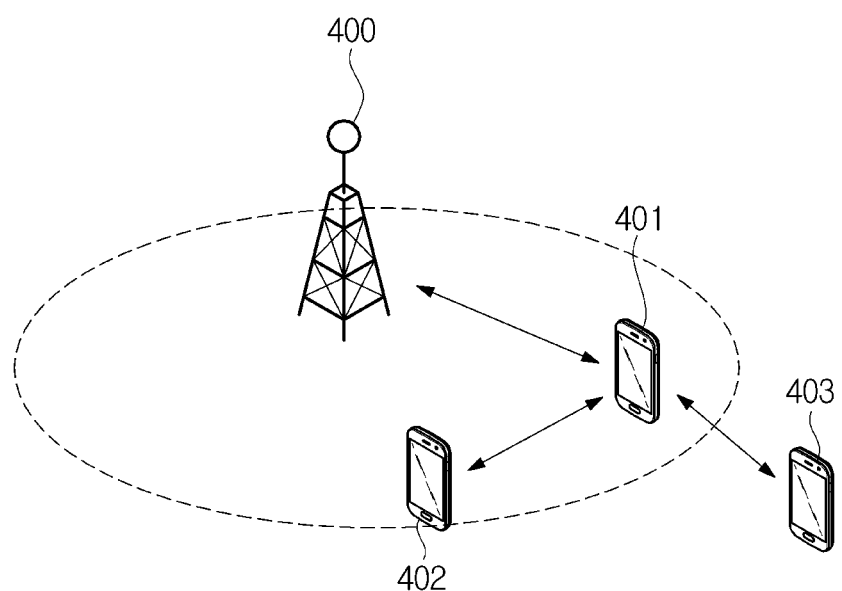
Figure 5B:
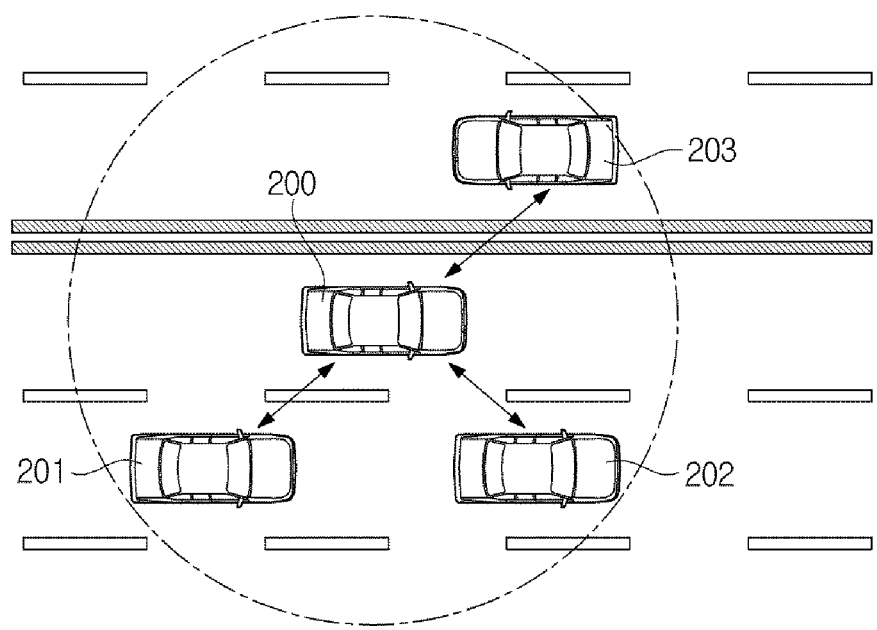
Figure 5C:
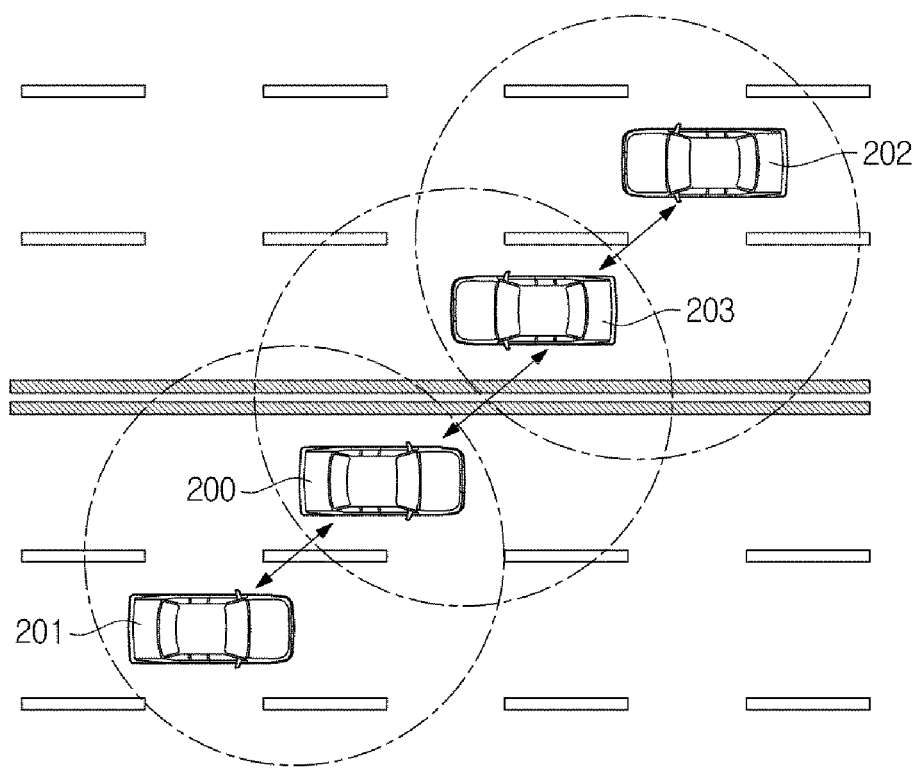
Figure 6:
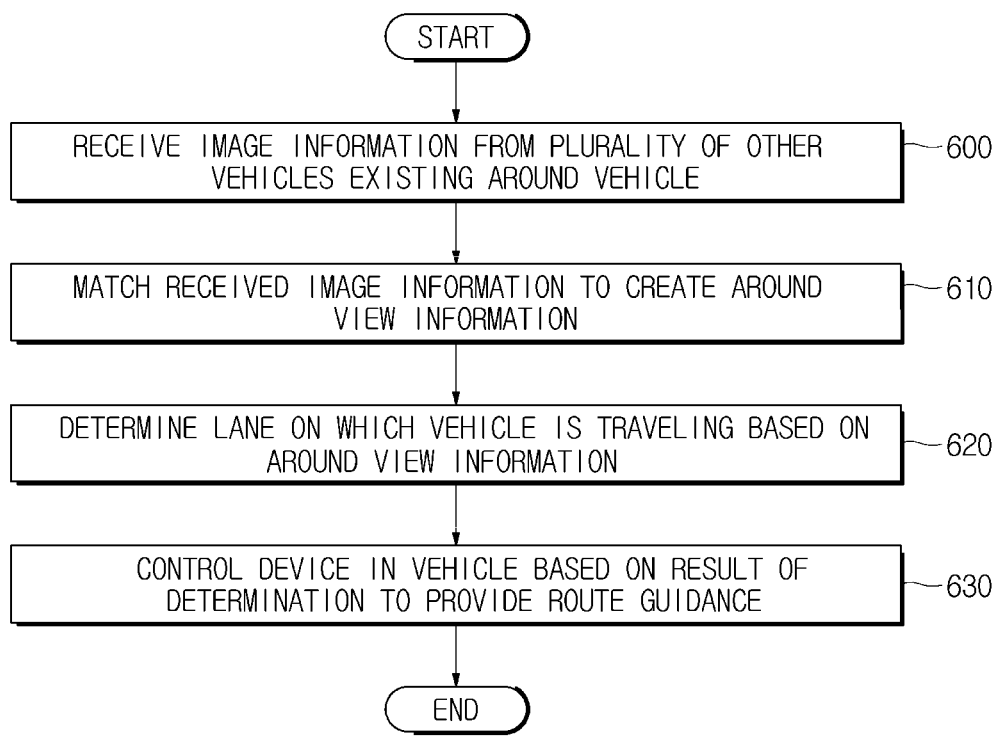
Figure 7:
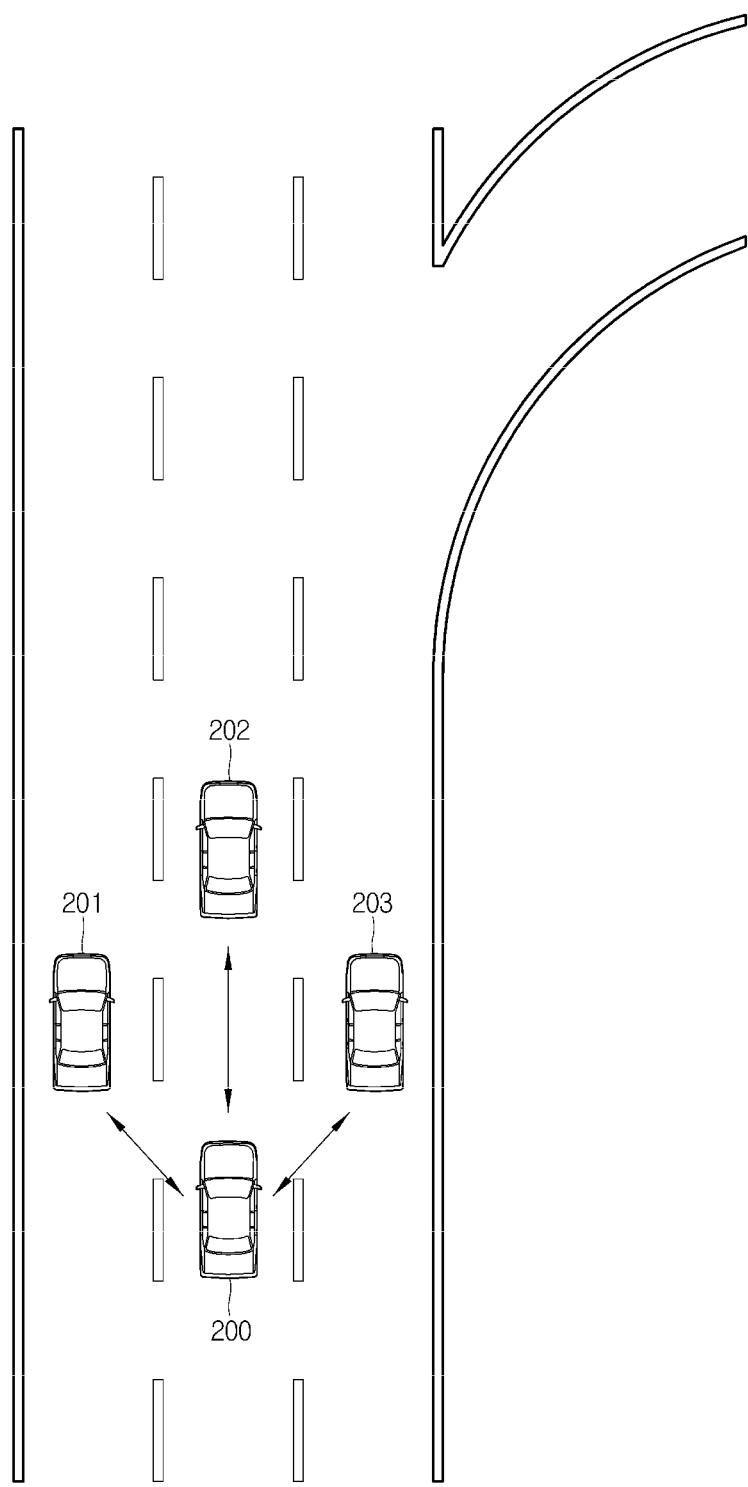
Figure 8:
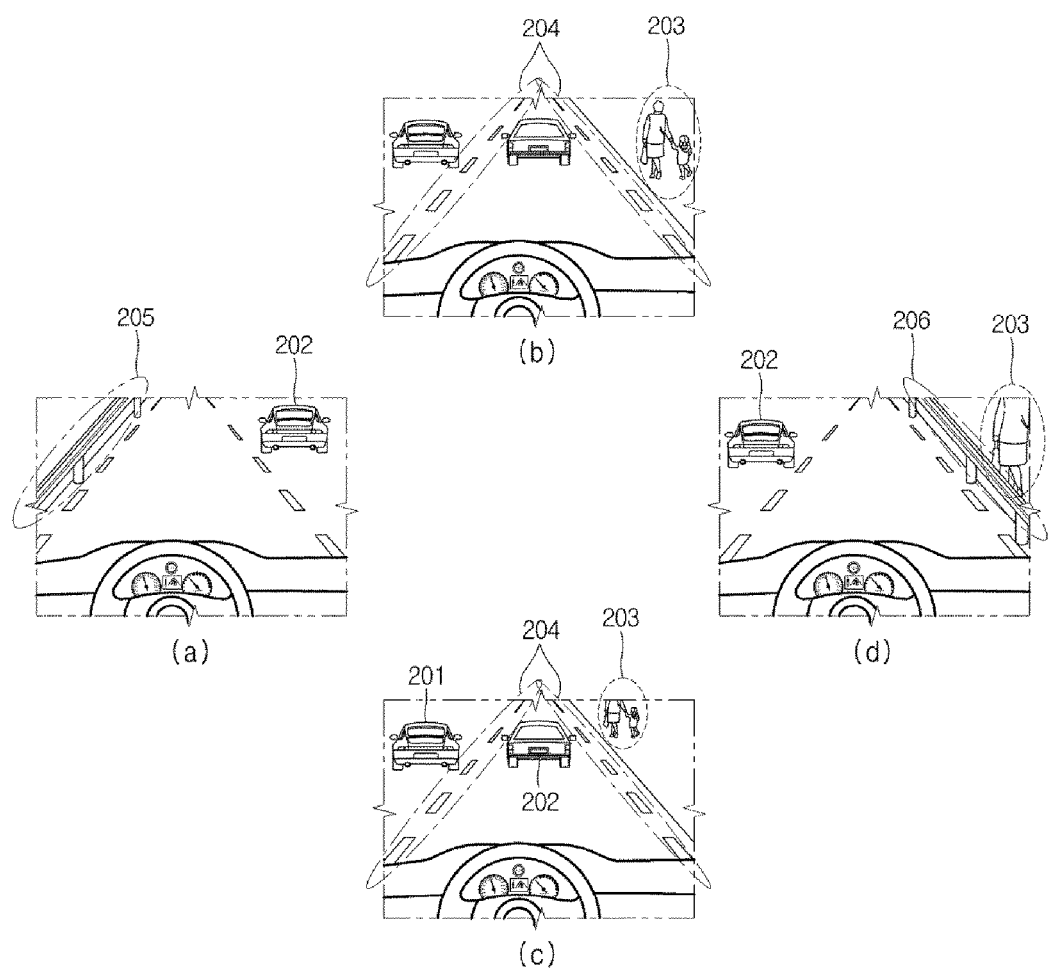
Figure 9:
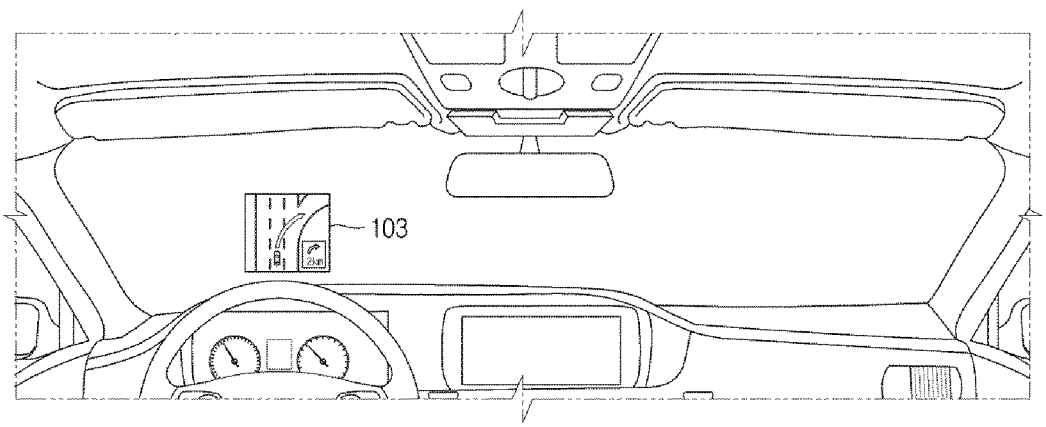
Figure 10:
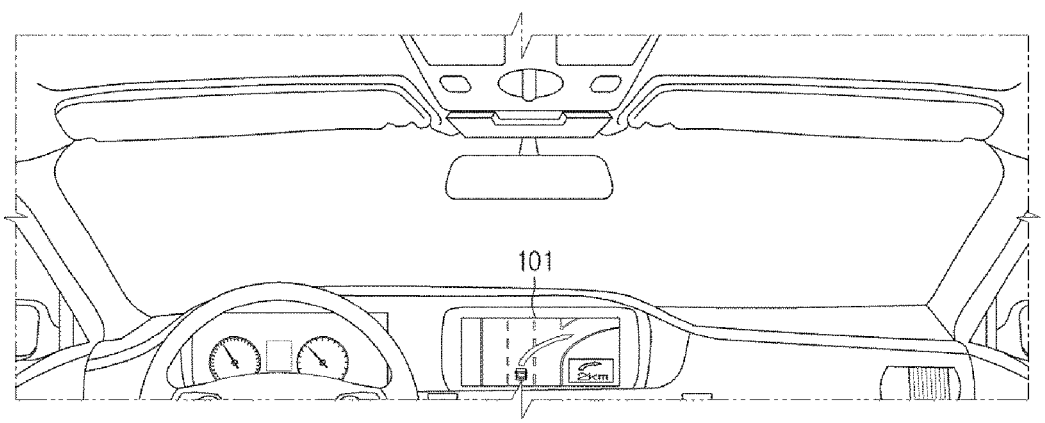
Figure 11:
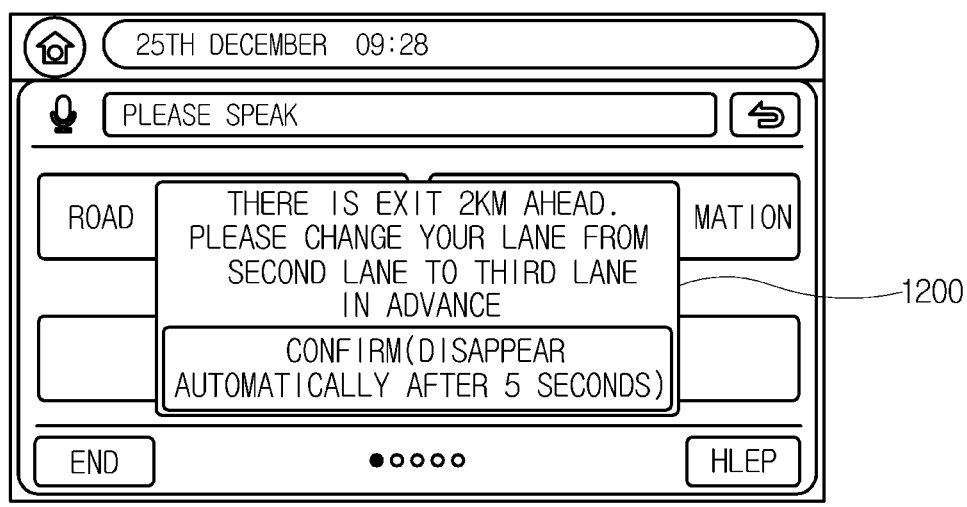

FIGS. 5A, 5B, and 5C are views for describing a communication method in a 5G network;

FIG. 6 is a flowchart illustrating an operation method of a vehicle for matching image information to create around view information and extracting road information from the around view information to thereby provide route guidance;

FIGS. 7 and 8 are views for describing a method of receiving image information from a plurality of vehicles to extract road information from the image information;

FIG. 9 shows a screen of a Head-Up Display (HUD) of providing route guidance;

FIG. 10 shows a screen of a AudioNideo/Navigation (AVN) display of providing route guidance; and FIG. 11 shows a screen of an AVN display that displays a pop-up message including route guidance-related information.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 1:
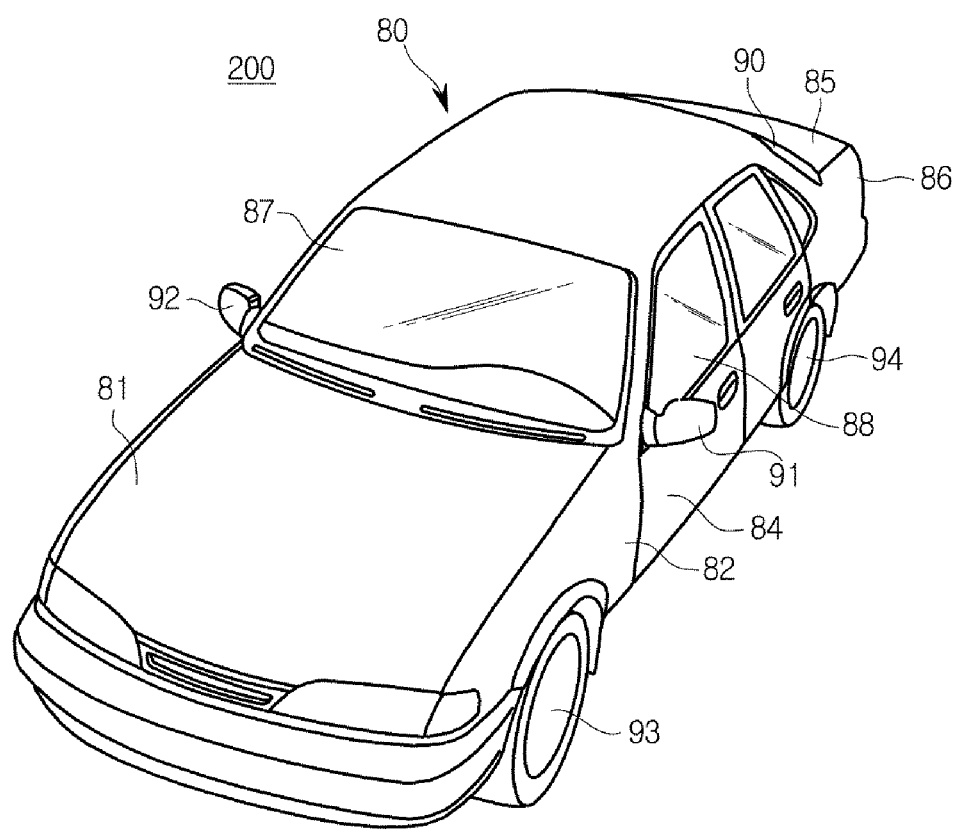
FIG. 1 shows an outer appearance of a vehicle.

Referring to FIG. 1, a vehicle 200 may include a vehicle body 80 forming the outer appearance of the vehicle 200, and a plurality of wheels 93 and 94 to move the vehicle 200. The vehicle body 80 may include a hood 81, front fenders 82, doors 84, a trunk rid 85, and quarter panels 86.

Also, the vehicle body 80 may include a front window 87 installed in the front part of the vehicle body 80 to provide a front view of the vehicle 200, side windows 88 installed in the doors 84 to provide side views of the vehicle 200, side mirrors 91 and 92 to provide rear and side views of the vehicle 200, and a rear window 90 installed in the rear part of the vehicle body 80 to provide a rear view of the vehicle 200. Hereafter, the internal configuration of the vehicle 200 will be described in detail.

Figure 2:
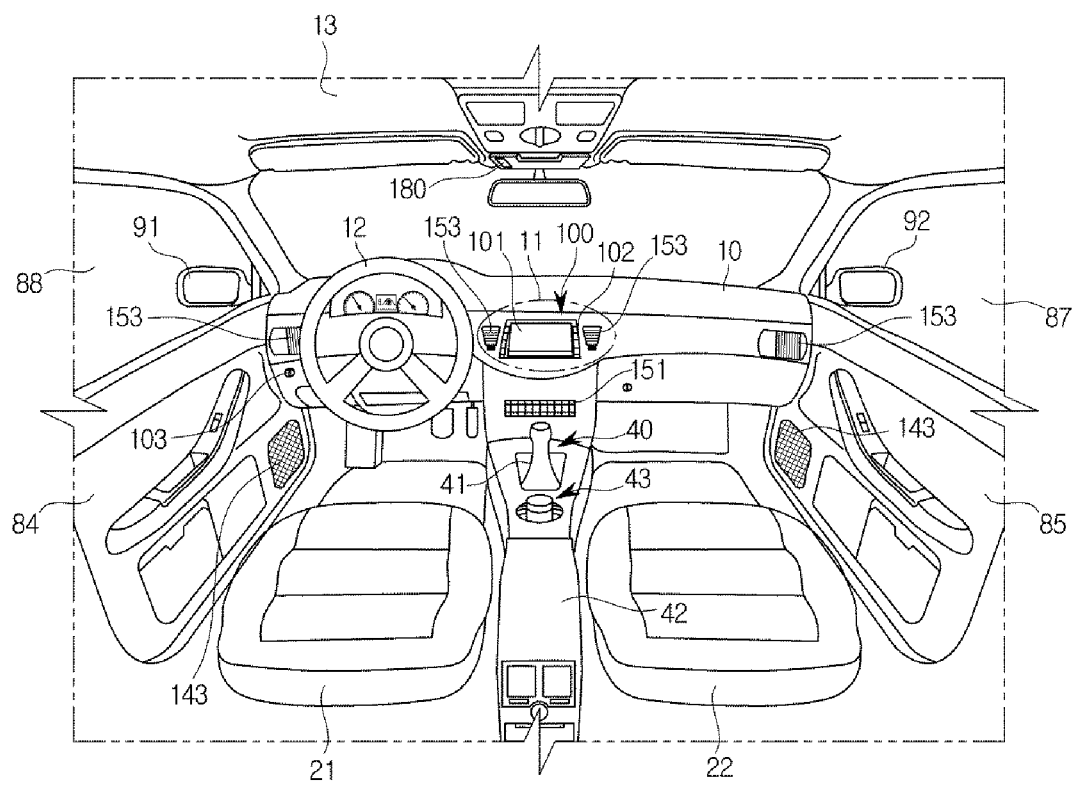
FIG. 2 shows the interior of a vehicle.
Figure 3:
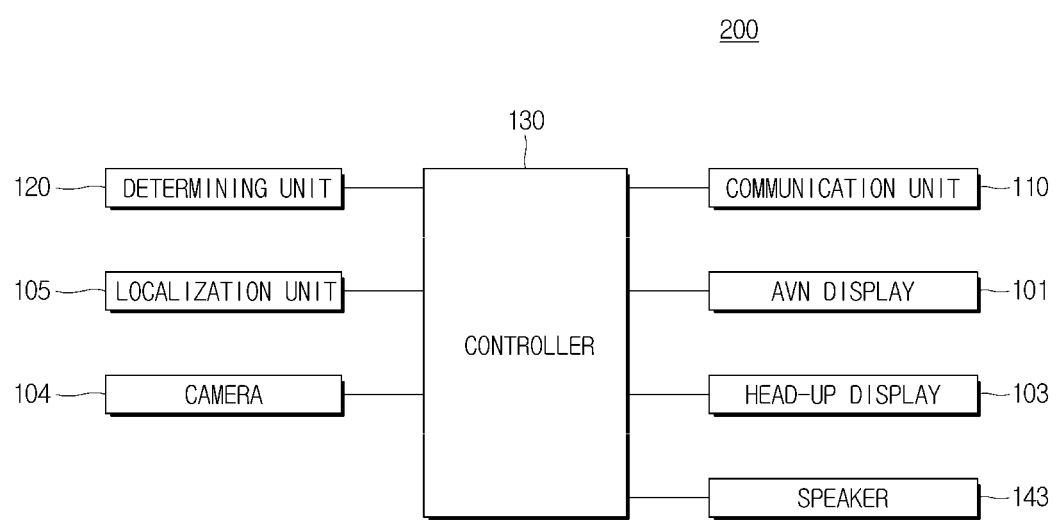
FIG. 3 is a block diagram of a vehicle for matching image information to create around view information and extracting road information from the around view information to thereby provide route guidance.
Figure 4:
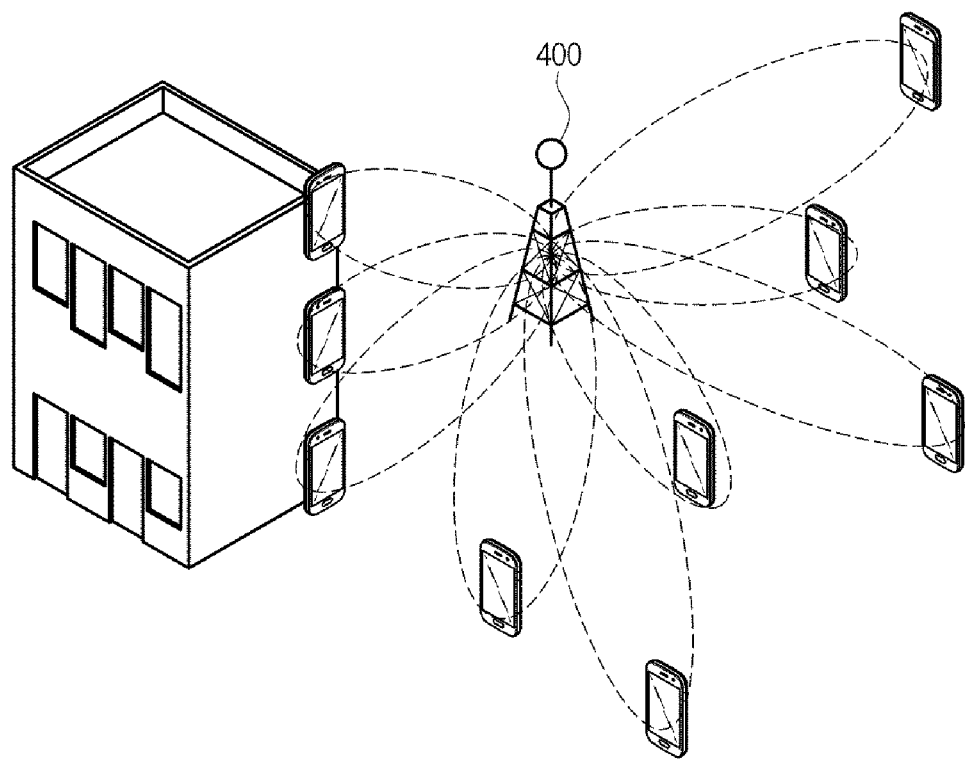
FIG. 4 shows a large-scale antenna system of a base station that uses a fifth generation (5G) communication method.

FIG. 2 shows the interior of the vehicle 200, and FIG. 3 is a block diagram of the vehicle 200 for matching image information to create around view information and extracting road information from the around view information to thereby provide route guidance. Also, FIG. 4 shows a large-scale antenna system of a base station that uses the fifth generation (5G) communication method, and FIGS. 5A, 5B, and 5C are views for describing a communication method in a 5G network.

The vehicle 200 may include an air conditioner that can perform both heating and cooling to discharge heated or cooled air through air vents 153 to thus control the inside temperature of the vehicle 200. The air conditioner is equipment to control air-conditioned environments including indoor/outdoor environmental conditions of the vehicle 200, air intake/exhaust, air circulation, and air-conditioned states, automatically or according to a user's control command.

Meanwhile, in the interior of the vehicle 200, an Audio/Video/Navigation (AVN) terminal 100 may be provided. The AVN terminal 100 is a terminal capable of providing audio and video functions, in addition to a function of providing a user with information about a route to a destination. The AVN terminal 100 may selectively display at least one of an audio screen, a video screen, and a navigation screen through a display unit 101, and also display various control screens related to the control of the vehicle 200 or screens related to additional functions that can be executed on the AVN terminal 100.

The AVN terminal 100 may interwork with the air conditioner described above to display various control screens related to the control of the air conditioner through the display unit 101. Also, the AVN terminal 100 may control the operation state of the air conditioner to adjust an air-conditioned environment inside the vehicle 200.

Meanwhile, the display unit 101 may be positioned in a center fascia 11 which is the central area of a dashboard 10. According to one form, the display unit 101 may be a Liquid Crystal Display (LCD), a Light Emitting Diode (LED) display, a Plasma Display Panel (PDP) display, an Organic Light Emitting Diode (OLED) display, or a Cathode Ray Tube (CRT) display, although not limited to these.

In the interior of the vehicle 200, a speaker 143 may be provided to output sound. Accordingly, the vehicle 200 may output sound required to provide an audio function, a video function, a navigation function, and other additional functions, through the speaker 143.

In the center fascia 11 which is the central area of the dashboard 10, a navigation input unit 102 may be positioned. A driver may manipulate the navigation input unit 102 to input various control commands. Also, the navigation input unit 102 may be provided as a hard key type around the display unit 101. If the display unit 101 is a touch screen type, the display unit 101 may itself function as the navigation input unit 102.

Meanwhile, in a center console 40, a center input unit 43 of a jog shuttle type or a hard key type may be provided. The center console 40 may be located between a driver seat 21 and a passenger seat 22, and include a gear shift lever 41 and a tray 42. The center input unit 43 may perform all or a part of the functions of the navigation input unit 102.

Referring to FIG. 3, the vehicle 200 may include, in addition to the display unit 101 (hereinafter, also referred to as an AVN display 101) and the speaker 143 as described above, a Head-Up Display (HUD) 103, a localization unit 105, a communication unit 110, a determining unit 120, and a controller 130. The determining unit 120 and the controller 130 may be integrated into at least one System On Chip (SOC) installed in the vehicle 200, and may be operated by a processor.

The localization unit 105 may measure the location of the vehicle 200 to acquire location information of the vehicle 200. The location information may be coordinate information, such as latitude, longitude, and altitude, although not limited to this. That is, the location information may be any information based on which the location of the vehicle 200 can be recognized.

Meanwhile, the localization unit 105 may be a Global Positioning System (GPS) that receives location information of an object from a satellite, or a Differential Global Positioning System (DGPS) that is an enhanced GPS for estimating the location of an object with great accuracy, although not limited to these. Location information that is transmitted from a satellite to a GPS on the ground may have errors. For example, when there are N (N≥2) GPSs located close to each other, the N GPSs may have similar errors. In this case, the DGPS may cancel such errors of the N GPSs to thereby acquire more accurate data. Accordingly, the vehicle 200 may accurately determine a lane on which itself is located, based on the location information of the vehicle 200 measured through the localization unit 105, which will be described later.

The communication unit 110 may transmit/receive radio signals between devices via a base station, through a communication method, such as a 3Generation (3G) communication method or a 4Generation (4G) communication method. Also, the communication unit 110 may transmit/receive radio signals containing data to/from another terminal within a predetermined distance, through a communication method, such as Wireless LAN (WLAN), Wireless Fidelity (Wi-Fi), Bluetooth, Zigbee, Wi-Fi Direct (WFD), Ultra Wideband (UWB), Infrared Data Association (IrDA), Bluetooth Low Energy (BLE), or Near Field Communication (NFC).

Also, the communication unit 110 may transmit/receive radio signals through the fifth generation (5G) communication method. The fourth generation (4G) communication method uses a frequency band of 2 GHz or less, whereas the 5G communication method can use a frequency band of about 28 GHz, although a frequency band the 5G communication method can use is not limited to 28 GHz.

In the 5G communication method, a large-scale antenna system may be used. The large-scale antenna system uses several tens of antennas to cover an ultra high frequency band and to simultaneously transmit/receive a large amount of data through multi-access. More specifically, the large-scale antenna system adjusts an arrangement of antenna elements to transmit/receive radio waves farther in a specific direction, thereby enabling massive transmission and expanding an available area in a 5G communication network.

Referring to FIG. 4, a base station 400 may transmit/receive data to/from many devices simultaneously through a large-scale antenna system. The large-scale antenna system may reduce transmission of radio waves in different directions from a direction in which radio waves should be transmitted to thus reduce noise, which leads to improvement in quality of transmission and reduction of energy.

Also, the 5G communication method may transmit, instead of transmitting transmission signals modulated through an Orthogonal Frequency Division Multiplexing (OFDM) method, radio signals modulated through a Non-Orthogonal Multiplexing Access (NOMA) method, thereby allowing multi-access of more devices while enabling massive transmission/reception.

For example, the 5G communication method can provide transmission speed of maximally 1. Gbps. Accordingly, the 5G communication method can support immersive communication requiring massive transmission to transmit/receive massive data, such as Ultra High Definition (UHD), 3D, and holograms. Accordingly, a user can use the 5G communication method to transmit/receive more delicate, immersive ultra-high capacity data at high speed.

Also, the 5G communication method may enable real-time processing having maximum response speed of 1 ms or less. Accordingly, the 5G communication method can support real-time services responding to inputs before a user recognizes them. For example, a vehicle may receive sensor information from various devices even during traveling and perform real-time processing on the sensor information to provide an autonomous driving system while providing various remote control. Also, the vehicle may use the 5G communication method to process sensor information related to other vehicles existing around the vehicle in real time to thereby provide a user with information about collision probability in real time while providing information about traffic situations of a driving path on which the vehicle travels in real time.

Also, through ultra real-time processing and massive transmission that are provided by the 5G communication method, the vehicle can provide a big data service to passengers in the vehicle. For example, the vehicle may analyze various web information or Social Network Service (SNS) information to provide customized information for passengers in the vehicle. According to one form, the vehicle may perform big data mining to collect information about famous restaurants or popular attractions around a driving path on which the vehicle travels to provide the collected information in real time, thereby enabling passengers to acquire various information about a region in which the vehicle travels.

Meanwhile, a 5G communication network can subdivide cells to support network densification and massive transmission. Herein, the cell means an area subdivided from a wide region in order to efficiently use frequencies for mobile communication. A low-power base station may be installed in each cell to support communication between terminals. For example, the 5G communication network may reduce the sizes of cells to further subdivide cells so as to be configured as a 2-stage structure of macrocell base station-distributed small base station-communication terminal.

Also, in the 5G communication network, relay transmission of radio signals through a multi-hop method may be performed. For example, as shown in FIG. 5A, a first terminal 401 may relay a radio signal transmitted from a third terminal 403 located outside a network of the base station 400, to the base station 400. Also, the first terminal 401 may relay a radio signal transmitted from a second terminal 402 located inside the network of the base station 400, to the base station 400. As described above, at least one device among devices that can use a 5G communication network may perform relay transmission through a multi-hop method. Accordingly, a region in which the 5G communication network is supported can be widened, and also, buffering occurring when there are too many users in a cell may be reduced.

Meanwhile, the 5G communication method can support Device-to-Device (D2D) communication that is applied to vehicles, wearable devices, and so on. The D2D communication, which is communication between devices, is used for a device to transmit/receive radio signals containing various stored data, as well as data sensed through sensors. According to the D2D communication, a device does not need to transmit/receive radio signals via a base station, and since radio signals are transmitted between devices, unnecessary energy consumption can be reduced. In order for a vehicle or a wearable device to use the 5G communication method, the corresponding device needs to have an antenna installed therein.

The vehicle 200 may transmit/receive radio signals to/from other vehicles existing around the vehicle 200 through D2D communication. For example, as shown in FIG. 5B, the vehicle 200 may perform D2D communication with other vehicles (that is, first, second, and third vehicles 201, 202, and 203) existing around the vehicle 200. Also, the vehicle 200 may perform D2D communication with a traffic signaling system (not shown) installed in intersections and the like.

According to another example, as shown in FIG. 5C, the vehicle 200 may transmit/receive radio signals to/from the first vehicle 201 and the third vehicle 203 through D2D communication, and the third vehicle 203 may transmit/receive radio signals to/from the vehicle 200 and the second vehicle 202 through D2D communication. In other words, a virtual network may be established between a plurality of vehicles 200, 201, 202, and 203 located within a range allowing D2D communication so as for the vehicles 200, 201, 202, and 203 to be able to transmit/receive radio signals therebetween.

Meanwhile, the 5G communication network may widen a region in which D2D communication is supported so that a device can perform D2D communication with another more distant device. Also, since the 5G communication network supports real-time processing having response speed of 1 ms or less and high capacity communication of 1 Gbps or more, a moving vehicle can transmit/receive signals containing desired data to/from another moving vehicle through the 5G communication network.

For example, a vehicle can access other vehicles, various servers, systems, etc. around the vehicle in real time, even during traveling, through the 5G communication method, so as to transmit/receive data to/from the other vehicles, various servers, systems, etc. and to process the data to provide various services such as a navigation service through augmented reality.

Also, the vehicle may use another frequency band than the above-described frequency band to transmit/receive radio signals containing data via a base station or through D2D communication. Also, the vehicle may use another communication method than the communication method using the above-described frequency band.

The communication unit 110 may receive image information from a plurality of other vehicles around the vehicle 200, via a base station or through D2D communication. The image information may be a front view image (or a front view moving image) of the vehicle 200, photographed by a camera installed in the vehicle 200. The "front" direction means a direction in which a passenger looks the front window inside a vehicle. The image information may include various objects, such as trees planted along a road, and traffic lights, as well as lanes, guardrails, and neighboring vehicles.

Meanwhile, the determining unit 120 may match the image information received from the plurality of other vehicles existing around the vehicle 200 to create around view information. The around view information may be an image created by matching the image information received from the plurality of other vehicles. Each of the vehicle 200 and the plurality of other vehicles may include a camera. In one form, the camera may be installed at the head lining of each vehicle to photograph a front view of the vehicle to thereby create image information. However, the camera may be installed at any other location as long as it can photograph a front view of the vehicle.

Also, the camera installed at each vehicle may be a stereoscopic camera. The stereoscopic camera, which is used to photograph stereoscopic pictures, can photograph images with multiple focal points. Accordingly, image information created by the stereoscopic camera may include information about a distance between the stereoscopic camera and an object. The determining unit 120 may estimate a distance to the object based on the information about the distance, and use the estimated distance to match the image information.

The determining unit 120 may match the image information received from the plurality of other vehicles to create the around view information, as described above. However, image information acquired at different times or at different viewpoints may be based on different coordinate systems. Also, if the cameras installed in the individual vehicles have different specifications or photograph an object with different magnifications, the object included in image information acquired by the cameras of the respective vehicles may appear with different sizes.

A technique of matching image information is to match different coordinate systems of a plurality of image information with one coordinate system. That is, the determining unit 120 may apply a matching technique to a plurality of image information to create around view information.

For example, the matching techniques include an image subtraction technique, a principal axes technique, a joint entropy technique, a mutual information technique, and a cross-correlation technique. The image subtraction technique is an intuitive similarity measurement technique to match image information based on a point at which a difference in brightness between two image information is minimized. The principal axes technique is to calculate the centers of gravity of an object to be matched in image information, to obtain the major axes of individual axes from the centers of gravity of the object, and to perform rotation and movement by a difference between the major axes to thus convert to an approximate location.

The joint entropy technique is to create a joint histogram using brightness values of an area in which two images overlap each other, to perform probability density calculation based on the joint histogram to calculate an area at which entropy is minimized, and to match image information based on the area. The mutual information technique is to match image information in consideration of marginal entropy when a plurality of image information to be matched have a great difference. The cross-correlation technique is to extract or divide a feature point or area of interest to match image information based on an area in which cross-correlation is maximized.

However, the matching technique that is used by the determining unit 120 to create around view information is not limited to any one of the above-described matching techniques, and the determining unit 120 may use any other matching technique capable of creating around view information.

For example, the determining unit 120 may match image information using a singularity included in the image information. The singularity may include an object that can be distinguished in the image information. For example, the singularity may include an object included in common in at least two of a plurality of image information, and an object as a criterion based on which lanes on a road can be distinguished among objects included in a plurality of image information. For example, the singularity may be a lane, or an object such as a tree, included in common in a plurality of image information, although not limited to these.

According to another form, the determining unit 120 may match the plurality of image information based on coordinate information and size information of the singularity to create around view information. A singularity included in common in a plurality of image information may appear at different locations in the plurality of image information, according to locations at which the plurality of image information were acquired.

For example, when the same tree exists in both first image information acquired by a first vehicle and second image information acquired by a second vehicle, the tree may be located at different coordinates in the first image information and the second image information, according to the locations of the first and second vehicles. If the tree in the first image information has a coordinate corresponding to the right of the tree in the second image information, it may be determined that a lane on which the first vehicle exists is located to the left of a lane on which the second vehicle exists.

The determining unit 120 may compare, when an object (that is, a singularity) is included in common in a plurality of image information, coordinate information of the object in one image information of the plurality of image information to coordinate information of the object in the other image information of the plurality of image information to thus determine left-right locations of the vehicle 200 and other vehicles. Accordingly, the determining unit 120 can set criterion for matching the image information using the coordinate information of the singularity.

Also, the determining unit 120 may compare the sizes of the singularity in the plurality of image information to determine front-rear locations of the vehicle 200 and the other vehicles. At this time, the determining unit 120 may use a scaling method to compare the sizes of the object to determine whether the object is the same one, and determine front-rear locations of the vehicle 200 and the other vehicles based on differences between the sizes of the object. The determining unit 120 may match the image information received from the plurality of vehicles, based on the determination results about the left-right and front-rear locations, that is, based on coordinate information and size information, to create around view information.

Meanwhile, lanes may have different colors and forms according to countries. Accordingly, the determining unit 120 may identify lanes according to lane colors and forms set in individual countries, based on image information, determine a location at which the image information is acquired, based on the identified lanes, and match the image information based on the location. That is, the determining unit 120 may set a lane to a singularity to use the lane as criterion for matching image information.

As another example, if image information is acquired by a stereoscopic camera, the image information may include information about a distance to an object. Accordingly, the determining unit 120 may compare distances to an object included in common in a plurality of image information to each other to determine which vehicle having a relative location with respect to the vehicle 200 each image information was transmitted from to match the image information, thereby creating around view information.

When the determining unit 120 matches the plurality of image information, an empty area or distortion of a boundary area may be generated. In this case, the determining unit 120 may correct such empty area or distortion of the boundary area.

For example, when the determining unit 120 matches a plurality of image information, the determining unit 120 may blend boundary areas to reduce distortion of the image information. As another example, if an empty area is generated when the determining unit 120 matches two image information, the determining unit 120 may interpolate the empty area with reference to another image information or process it as empty space. However, the determining unit 120 may use any of various correction methods well-known in the art.

Meanwhile, the determining unit 120 may exclude image information that does not guarantee real-time from among received image information, and match the remaining image information to thus create around view information. For example, image information generated or acquired a long time ago will be not able to reflect current situations.

Accordingly, the determining unit 120 may set a predetermined valid time, exclude image information if the predetermined valid time has elapsed after the image information has been photographed, and then match the remaining image information to create around view information, thereby guaranteeing real-time. The valid time may have been set in advance. According to one form, the valid time may be set to N seconds (N≤3), although not limited to this.

Meanwhile, the determining unit 120 may extract road information and vehicle information from the around view information, and determine a road on which the vehicle 200 is located, based on the extracted information. The road information may be information about a road on which the vehicle 200 is travelling, and may include information about the number of lanes of a road on which the vehicle 200 is traveling, and information about a lane on which the vehicle 200 is traveling. The vehicle information may be information about other vehicles located around the vehicle 200, and may include information about the locations and kinds of other vehicles traveling around the vehicle 200. For example, the determining unit 120 may recognize all lanes of the road and determine a lane on which the vehicle 200 is located among the recognized lanes, based on the road information, and determine the locations of other vehicles located around the vehicle 200, based on the vehicle information.

At this time, the determining unit 120 may more accurately determine a lane on which the vehicle 200 is located, based on the location information of the vehicle 200 measured by the localization unit 105, in addition to the around view information. Also, the determining unit 120 may compare the location information of the vehicle 200 to location information received from other vehicles so as to more accurately determine a lane on which the vehicle 200 is located.

Meanwhile, the determining unit 120 may determine traffic flow for each of all the lanes of the road on which the vehicle 200 is traveling, based on the road information and vehicle information extracted from the around view information. That is, the determining unit 120 may recognize all the lanes of the road on which the vehicle 200 is traveling, detect the locations of the vehicle 200 and other vehicles on the recognized lanes, and determine traffic congestion for each lane, based on the road information and the vehicle information.

Then, the determining unit 120 may set a driving route to a more open lane, based on information about traffic congestion determined for each lane. Accordingly, the controller 130 may control a device in the vehicle 200 to provide a driver with driving path information to which traffic flow for each lane is reflected, so that the driver can arrive at a destination more quickly, which will be described later.

Meanwhile, the controller 130 may control overall operations of the vehicle 200. For example, the controller 130 may control operations of various devices installed in the vehicle 200, as well as various modules installed in the AVN terminal 100. More specifically, the controller 130 may generate control signals for controlling various modules installed in the AVN terminal 100 and various devices installed in the vehicle 200 to control operations of the components.

The controller 130 may control a device in the vehicle 200 based on the around view information to provide route guidance. Herein, the device in the vehicle 200 may include various kinds of devices installed in the vehicle 200 and configured to provide a driver with route guidance.

For example, the controller 130 may control the speaker 143 to output the content of route guidance. Also, the controller 130 may control the AVN display 101 to display the content of route guidance on the screen. Also, the controller 130 may control the HUD 103 to display the content of route guidance on the screen. Also, the controller 130 may control a windshield display to provide route guidance. As such, the controller 130 can provide a driver with route guidance through various devices.

Also, the controller 130 may provide route guidance to which real situations are reflected, based on the road information and vehicle information extracted from the around view information. For example, if the controller 130 detects other vehicles located around the vehicle 200 based on road information and vehicle information, and determines that the vehicle 200 currently running on the second lane needs to make a lane change to the third lane in advance since too many vehicles run on the second lane, the controller 130 may recommend a driver of advancing a time at which a lane change is induced through the device in the vehicle 200. That is, the road information and the vehicle information extracted from the around view information may be used to determine lanes, and also provided as a guide line in providing a driving route for the vehicle 200. Accordingly, the driver who drives the vehicle 200 according to the current form can receive route guidance to which more real situations are reflected, than when dynamic route guidance system of providing route guidance only through real-time traffic information is used. Also, the controller 130 may provide route guidance to which traffic flow for each lane is reflected, through a device capable of providing a driver with route guidance, such as the speaker 143, the AVN display 101, and the windshield display.

FIG. 6 is a flowchart illustrating an operation method of a vehicle for matching image information to create around view information and extracting road information from the around view information to thereby provide route guidance, FIGS. 7 and 8 are views for describing a method of receiving image information from a plurality of vehicles to extract road information from the image information, FIG. 9 shows a screen of a HUD of providing route guidance, FIG. 10 shows a screen of an AVN display of providing route guidance, and FIG. 11 shows a screen of an AVN display that displays a pop-up message including route guidance-related information.

Referring to FIG. 6, a vehicle may receive a plurality of image information from a plurality of other vehicles existing around the vehicle, in operation 600. At this time, the vehicle may receive a plurality of image information from a plurality of other vehicles existing around the vehicle, through D2D communication. Alternatively, the vehicle may receive a plurality of image information from a plurality of other vehicles existing around the vehicle, via a base station.

Then, the vehicle may match the plurality of image information to create around view information, in operation 610. The around view information created by matching the plurality of image information received from the plurality of other vehicles may include road information about a road on which the vehicle is traveling. That is, the around view information may include vehicle information about the plurality of vehicles existing around the vehicle, information about current road conditions, and information about the lanes of the road on which the vehicle is traveling.

For example, referring to FIG. 7, the road may have three lanes. The most left lane of the three lanes corresponds to a first lane, the center lane of the three lanes corresponds to a second lane, and the most right lane of the three lanes corresponds to a third lane. In this case, as shown in FIG. 7, a vehicle 200 may travel on the second lane, a first vehicle 201 may travel on the first lane, a second vehicle 202 may travel on the second lane, and a third vehicle 203 may travel on the third lane.

The vehicle 200 may receive image information from the first vehicle 201, the second vehicle 202, and the third vehicle 203, through D2D communication. Referring to FIG. 8, FIG. 8A shows image information received from the first vehicle 201, FIG. 8B shows image information received from the second vehicle 202, FIG. 8C shows image information photographed by the second vehicle 202, and FIG. 8D shows image information received from the third vehicle 203.

The vehicle 200 may match the image information received from the first to third vehicles 201, 202, and 203 with the image information photographed by the vehicle 200. Referring to FIG. 8, the plurality of image information may include various objects existing around the road, as well as lanes, in common.

For example, if the vehicle 200 determines that differences between the coordinates of lanes 204 in the image information of FIG. 8C and the coordinates of the lanes 204 in the image information of FIG. 8B are smaller than a predetermined value, or that a difference between the angle of the lanes 204 of FIG. 8C and the angle of the lanes 204 of FIG. 8B is smaller than another predetermined value, and that the lanes 204 of FIG. 8C are synchronized with the lanes 204 of FIG. 8B based on the results acquired by applying a scaling technique for adjusting the sizes of the lanes 204 of FIGS. 8C and 8B, the vehicle 200 may determine that itself is traveling on the same lane as the second vehicle 202.

Also, the image information from the second vehicle 202 as shown in FIG. 8B, the image information from the third vehicle 203 as shown in FIG. 8D, and the image information of the vehicle 200 as shown in FIG. 8C may include an object 203 in common. The object 203 may have different coordinates and different sizes in the respective image information. In this case, the vehicle 200 may set the object 203 to a singularity, determine location relationship between the vehicle 200, the second vehicle 202, and the third vehicle 203, based on the singularity, and match the image information as shown in FIGS. 8A, 8B, and 8C, based on the determination result of the location relationship.

Alternatively, the vehicle 200 may extract objects 205 and 206 such as guardrails, which are criterion for dividing lanes, from the image information, set such objects 205 and 206 to singularities, and determine the locations of the vehicles 200, 202, and 203 based on the singularities to thereby match the image information.

Accordingly, the vehicle may determine which lane it is traveling on, based on the around view information created by matching the image information, in operation 620. For example, the vehicle may determine the number of lanes of the road on which it is traveling, and determine which lane it is traveling on, based on the around view information.

Then, the vehicle may control an internal device based on the result of the determination to provide route guidance, in operation 630. The vehicle may provide a guide for a driving route through devices capable of providing a driver with various information.

For example, the vehicle may display, as shown in FIG. 9, an image showing a lane on which it is currently traveling and indicating that the vehicle should make a way to a right exit 2 km ahead, through the HUD 103. As another example, the vehicle may display an image showing a lane on which it is currently traveling and indicating that the vehicle should make a way to a right exit 2 km ahead, through the AVN display 101.

Alternatively, the vehicle may display, as shown in FIG. 11, a pop-up message including text "There Is an Exit 2 km Ahead. Please Change Your Lane from Second Lane to Third Lane", through the AVN display 101. However, a method of providing route guidance is not limited to these.

The method according to the above-described form can be embodied in the form of program instructions, which can be performed through various computer means, and can be written in computer-readable recording medium. The computer-readable recording medium can include program instructions, data files, data structures, and the combination thereof. The program instructions stored in the storage medium can be designed and configured specifically for an exemplary form or can be publically known and available to those who are skilled in the field of computer software. Examples of the computer-readable recording medium can include magnetic media, such as a hard disk, a floppy disk, and a magnetic tape, optical media, such as CD-ROM and DVD, magneto-optical media, such as a floptical disk, and hardware devices, such as ROM, RAM and flash memory, which are specifically configured to store and run program instructions.

Examples of program instructions include both machine code, such as produced by a compiler, and high-level language code that may be executed on the computer using an interpreter. The hardware devices may be configured to act as one or more software modules in order to perform the operations of the above-described forms, or vice versa.

Although forms have been described by specific examples and drawings, it will be understood to those of ordinary skill in the art that various adjustments and modifications are possible from the above description. For example, although the described techniques are performed in a different order, and/or the described system, architecture, device, or circuit component are coupled or combined in a different form or substituted/replaced with another component or equivalent, suitable results can be achieved.

Therefore, other implementations, other forms, and things equivalent to claims are within the scope of the claims to be described below.

What is claimed is:

1. A vehicle comprising:
    a transceiver configured to receive image information from a plurality of other vehicles existing around a vehicle, the image information including a plurality of images; and
    a processor configured to:
        match the received image information to create surrounding view information,
        determine a lane of a road on which the vehicle travels, based on the surrounding view information, and
        control a device in the vehicle based on a result of the determination of the lane on which the vehicle travels to provide a route guidance,
    wherein the processor is configured to create the surrounding view information using coordinate information and size information of at least one singularity included in the received image information,
    wherein the at least one singularity includes an object common in the plurality of images, and the processor is configured to:
        set the object as a criterion and distinguish the criterion from other objects included in the plurality of images,
        compare coordinate information of the criterion in one image of the plurality of images with coordinate information of the criterion in another image of the plurality of images,
        determine a location of the vehicle relative to the other vehicles based on the coordinate information of the criterion,
        distinguish the lane on which the vehicle is located from a lane of the road on which the other vehicles are located based on coordinate information of the criterion,
        exclude an image of the received image information when a predetermined valid time has elapsed,
        reset another object common in remaining images as the criterion after excluding the image, and
        match remaining image information to create the surrounding view information based on the reset criterion after the processor excludes the image from the received image information.

2. The vehicle according to claim 1, wherein the transceiver is configured to receive the image information from the plurality of other vehicles existing around the vehicle, through Device-to-Device (D2D) communication or via a base station.

3. The vehicle according to claim 1, wherein the processor is configured to match the received image information using at least one singularity included in the received image information to create the surrounding view information.

4. The vehicle according to claim 1, further comprising a Global Positioning System (GPS) configured to acquire location information of the vehicle.

5. The vehicle according to claim 4, wherein the processor is configured to specify the lane on which the vehicle is located among all lanes of the road on which the vehicle travels, using the surrounding view information and the location information of the vehicle.

6. The vehicle according to claim 1, wherein the processor is configured to control the device in the vehicle based on road information and vehicle information extracted from the surrounding view information to provide the route guidance.

7. The vehicle according to claim 6, wherein the processor is configured to determine a traffic flow for each lane of the road on which the vehicle travels, based on the road information and the vehicle information, and to set a driving route to which the traffic flow for each lane is reflected, based on the traffic flow for each lane and the result of the determination on the lane on which the vehicle is located.

8. The vehicle according to claim 1, wherein the processor controls at least one of a display, a Head-Up Display (HUD), a windshield display, and a speaker in the vehicle, based on the result of the determination, to provide the route guidance.

9. A method of controlling a vehicle, comprising:
receiving, by a transceiver, image information from a plurality of other vehicles existing around a vehicle, the image information including a plurality of images;
determining, by a processor, a lane of a road on which the vehicle travels, based on surrounding view information created by matching the received image information; and
controlling, by the processor, a device in the vehicle based on a result of the determination to provide a route guidance,
wherein the determining of the lane comprises creating the surrounding view information using coordinate information and size information of at least one singularity included in the received image information, and
wherein the singularity includes an object common in the plurality of images, and setting the object as a criterion and distinguishing the criterion from other objects included in the plurality of images are performed by the processor;
distinguishing, by the processor, the lane on which the vehicle is located from a lane of the road on which the other vehicles are located based on coordinate information of the criterion;
comparing, by the processor, coordinate information of the criterion in one image of the plurality of images with coordinate information of the criterion in another image of the plurality of images;
determining, by the processor, a location of the vehicle relative to the other vehicles based on the coordinate information of the criterion,
excluding, by the processor, an image of the received image information when a predetermined valid time has elapsed;
resetting, by the processor, another object common in remaining images as the criterion after excluding the image; and
matching, by the processor, remaining image information to create the surrounding view information based on the reset criterion after excluding the image of the received image information when the predetermined valid time has elapsed.

10. The method according to claim 9, wherein the receiving of the image information comprises receiving the image information from the plurality of other vehicles existing around the vehicle, through a Device-to-Device (D2D) communication or via a base station.

11. The method according to claim 9, wherein the determining of the lane on which the vehicle travels comprises matching the received image information using at least one singularity included in the received image information to create the surrounding view information.

12. The method according to claim 9, wherein the determining of the lane on which the vehicle travels further comprises acquiring location information of the vehicle, through a GPS.

13. The method according to claim 12, wherein the determining of the lane on which the vehicle travels further comprises specifying the lane on which the vehicle is located among all lanes of the road on which the vehicle travels, using the surrounding view information and the location information of the vehicle.

14. The method according to claim 9, wherein the determining of the lane on which the vehicle travels comprises matching the received image information to create the surrounding view information, and extracting road information and vehicle information from the surrounding view information, and
wherein the controlling of the device in the vehicle comprises controlling the device in the vehicle based on the extracted road information and the extracted vehicle information to provide the route guidance.

15. The method according to claim 14, wherein the determining of the lane on which the vehicle travels comprises determining a traffic flow for each lane of the road on which the vehicle travels, based on the road information and the vehicle information, and setting a driving route to which the traffic flow for each lane is reflected, based on the traffic flow for each lane and the result of the determination on the lane on which the vehicle is located.

16. The method according to claim 9, wherein the controlling of the device in the vehicle comprises controlling at least one of a display, a Head-Up Display (HUD), a windshield display, and a speaker in the vehicle, based on the result of the determination, to provide the route guidance.

* * * * *